United States Patent [19]

Zimmer et al.

[11] Patent Number: 4,859,368
[45] Date of Patent: Aug. 22, 1989

[54] PROCESS FOR THE CONTAINMENT OF MATERIALS IN A CERAMIC MATRIX THROUGH THE CHEMICAL PRECIPITATION OF A HYDROSOL OF THE MATRIX

[75] Inventors: Erich Zimmer, Kreuzau-Bilstein; Hans Langen, Julich; Kurt Scharf, Erftstadt, all of Fed. Rep. of Germany

[73] Assignee: Kernforschungsanlage Julich Gesellschaft mit beschrankter Haftung, Julich, Fed. Rep. of Germany

[21] Appl. No.: 104,760

[22] Filed: Oct. 2, 1987

[30] Foreign Application Priority Data

Oct. 7, 1986 [DE] Fed. Rep. of Germany ....... 3634111

[51] Int. Cl.$^4$ .......................... G21F 9/16; C09K 3/00; C03C 3/00
[52] U.S. Cl. .................................... 252/629; 252/634; 252/635; 264/0.5; 501/12
[58] Field of Search ............... 252/628, 629, 634, 635; 501/12; 264/0.5

[56] References Cited

U.S. PATENT DOCUMENTS

| | | | |
|---|---|---|---|
| 3,312,629 | 4/1967 | Smith | 252/635 |
| 3,312,631 | 4/1967 | Smith | 252/635 |
| 3,312,632 | 4/1967 | Smith | 252/635 |
| 3,345,437 | 10/1967 | Flack et al. | 252/635 |
| 3,666,426 | 5/1972 | Burkhardt | 252/635 |
| 3,669,632 | 6/1972 | Kanij et al. | 252/635 |
| 4,060,497 | 11/1977 | Huschka | 252/635 |
| 4,193,953 | 3/1980 | Langen et al. | 252/635 |
| 4,224,258 | 9/1980 | Langen et al. | 252/635 |
| 4,382,885 | 5/1983 | Haas | 252/634 |
| 4,415,536 | 11/1983 | Haas et al. | 252/635 |

FOREIGN PATENT DOCUMENTS

| | | | |
|---|---|---|---|
| 2459445 | 8/1976 | Fed. Rep. of Germany | 252/635 |
| 2714873 | 8/1978 | Fed. Rep. of Germany | 252/635 |
| 2284956 | 5/1976 | France | 252/635 |

OTHER PUBLICATIONS

Tiegs, et al., 1979, The Sphere-Cal Process: Fabrication of Fuel Pellets From Gel Microspheres. Oak Ridge National Laboratory, Ornly TM-6906. Sep. 44 pages.
*Sol-Gel-Derived Waste Forms,* W. J. Lackey, et al. pp. 351-364.
*Fixation of Haw and Tru Waste in a Ceramic Matrix Via a Sol Gel Process,* E. Zimmer, pp. 1-10.

Primary Examiner—Howard J. Locker
Attorney, Agent, or Firm—Scully, Scott, Murphy & Presser

[57] ABSTRACT

A process for the embedding or containment of waste materials, especially of radioactive waste materials, by embedding in a ceramic matrix through the intermediary of the chemical precipitation of a hydrosol of the matrix, which is formed through the reaction of a nitrate with ammonia or ammonium hydroxide. In this process, the hydrosol is trickled in a pouring column into a precipitation bath, subsequent to the introduction of the material which is to be embedded, in which the hydrosol particles which are formed during the trickling gelatinize into gel particles. The gel particles are removed from the precipitation bath, washed, dried and finally sintered.

2 Claims, 1 Drawing Sheet

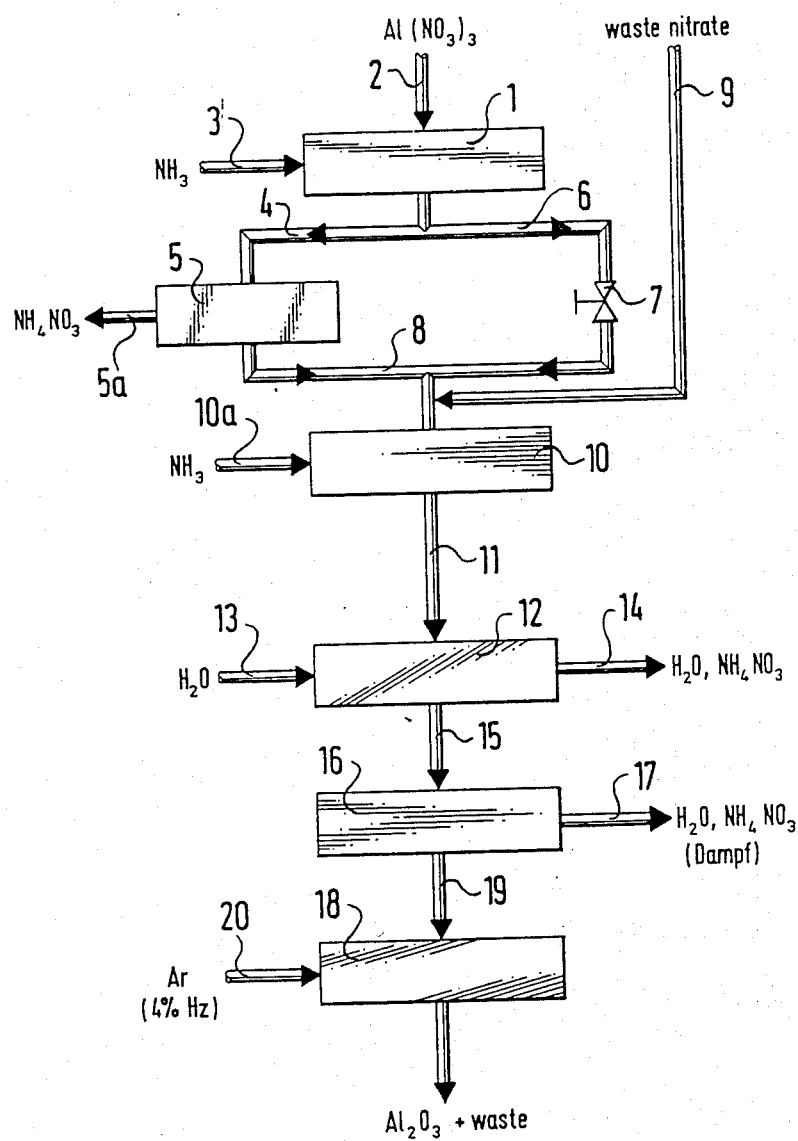

PROCESS FOR THE CONTAINMENT OF MATERIALS IN A CERAMIC MATRIX THROUGH THE CHEMICAL PRECIPITATION OF A HYDROSOL OF THE MATRIX

BACKGROUND OF THE INVENTION

1. Field of the Invention

The present invention relates to a process for the embedment or containment of waste materials, especially of radioactive waste materials, by the embedding or containment thereof in a ceramic matrix through the intermediary of the chemical precipitation of a hydrosol of the matrix, which is formed through the reaction of a nitrate with ammonia or ammonium hydroxide. In the process, the hydrosol is trickled in a pouring column into a precipitation bath, subsequent to the introduction of the material which is to be embedded, in which the hydrosol particles which are formed during the trickling gelatinize into gel particles. The gel particles are removed from the precipitation bath, washed, dried and finally sintered.

2. Discussion of the Prior Art

The above-described process is known, in particular, for the containment or embedding of wastes which contain radioactive materials. The wastes are embedded in this manner in a resistant or high-strength ceramic matrix, which prevents any egress of the noxious materials into the biosphere. This process is described in Jül-Conf-42 (Vol. 1) June 1981, ISSN 0344-5798, "Proceedings of the International Seminar on Chemistry and Process Engineering for High-Level Liquid Waste Solidification". For the containment of the radioactive waste materials it is possible to proceed from the Sol/-Gel-process with internal gelatinizing, having reference to the article in the above-mentioned publication by W. J. Lackey, et al., "Sol-Gel-Derived Waste Forms", page 350 et seq; whereas with the utilization of more stable starting solutions, there is also employable the external gelatinizing; for example, by referring in the same publication to the article by E. Zimmer, "Fixing of HAW- and TRU-Waste über ein Sol/Gel-Verfaren", page 338 et seq. In the last mentioned process, hydrosols are produced from aqueous solutions of nitrates of the radioactive waste materials and aluminum nitrate under the addition of ammonia. Thereby, for the formation of the hydrosol, there is initially carried out only a part of the precipitation reaction

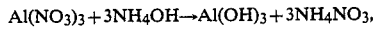

$$Al(NO_3)_3 + 3NH_4OH \rightarrow Al(OH)_3 + 3NH_4NO_3,$$

as a result of which there are produced viscous, readily tricklable hydrosols. In the second process step, the hydrosol is then trickled into a precipitation bath which is constituted of an aqueous ammonia solution. Thereby, the precipitation reaction is terminated, and from the hydrosol droplets there are formed gel particles. The gel particles contain ammonium nitrate from the precipitation reaction, which is removed in a washing step after the removal of the gel particles from the precipitation bath. However, during this washing, a part of the introduced materials will again dissolve, so that during the embedding of radioactive waste materials, for example, cesium is quantitatively encountered in the wash water. As a consequence, prior to the discharge of the washing water into waste water or effluent drainages, there is required a cleansing and removal of the radioactive materials entrained therein.

SUMMARY OF THE INVENTION

Accordingly, it is an object of the present invention to improve upon the necessary purification or cleansing of the wash water and upon the removal of the material components which are dissolved in the wash water.

The foregoing object is achieved through the intermediary of the above-mentioned process as set forth by the invention, in that the material which is to be contained or embedded in the matrix is introduced into a hydrosol which is extensively free of ammonium nitrate. In pursuance with the foregoing, the material which is to be contained or embedded in the ceramic matrix is introduced into a hydrosol which is substantially freed of ammonium nitrate which is formed as a reaction product during the formation of the hydrosol. The hydrosol which is employed for the gelatinizing and the containment, as a result, contains only a minute quantity of ammonium nitrate. After the gelatinizing of the hydrosol particles, in conjunction with the washing water there is to be essentially discharged only the residual quantity of the ammonium nitrate which is formed during the gelatinizing of the hydrosol particles in the precipitation bath. Thereby, it is possible to recover the particle components, which are dissolved in the wash water at a higher concentration, which facilitates the required removal of these materials prior to the discharge of the wash water into the biosphere.

Pursuant to a further feature of the invention, the hydrosol is freed from ammonium nitrate immediately prior to the introduction of the material which is is be contained so as not to cause any destabilization of the formed hydrosol through the withdrawal of ammonium nitrate. The ammonium nitrate which is drawn off in this manner is, in an advantageous manner, also prevented from coming into contact with the material which is to be contained in the hydrosol, as a result of which, especially during the containment or embedment of radioactive wastes, no special measures need to be implemented during the discharge of the ammonium nitrate which is withdrawn from the hydrosol. The former can be further employed without any danger or, if required, recycled for the recovery of the starting materials for the formation of the hydrosol.

Preferably, the ammonium nitrate is separated from the hydrosol through dialysis. For this purpose, the hydrosol is introduced into a dialysis cell possessing a membrane which is constituted of regenerated cellulose, and which is permeable to the ammonium nitrate as the specific material component with the lower molecular weight in contrast with the high-molecular hydrosol.

BRIEF DESCRIPTION OF THE DRAWING

Reference may now be had to the following detailed description of exemplary embodiments of the invention, taken in conjunction with the accompanying single FIGURE of drawing illustrating a flow diagram of the process for the containment of radioactive waste.

DETAILED DESCRIPTION

In the flow diagram represented by the drawing FIGURE, there is shown the preparation of the hydrosol as a first process step. For the formation of an $Al_2O_3$ hydrosol, $Al(NO_3)_3$ and $NH_3$ as the starting materials are brought into reaction with each other. The starting materials are introduced into a hydrosol preparation unit 1 through supply lines 2 and 3. From the hydrosol preparation unit, at least a partial quantity of the obtained reaction products is conducted through a flow line 4 into a dialysis apparatus 5. This partial quantity can be adjusted through a bypass 6 possessing a flow regulator 7. In the illustrated embodiment, the flow regulator 7 is closed, whereby the entire quantity of the product produced in the hydrosol preparation unit flows through the dialysis apparatus 5. Consequently, there is removed the major portion of the ammonium nitrate which is produced during the hydrosol formation (withdrawal of $NH_4NO_3$ through discharge line 5a). Remaining in the hydrosol is merely a minute residue of ammonium nitrate which is produced by the employed dialysis process.

Introduced into the hydrosol, which is drawn off from the dialysis apparatus 5 through a discharge line 8, by means of a delivery line 9 which connects into the discharge line 8, is the material which is to be entrained in the hydrosol. In the exemplary embodiment, this material which is to be entrained or embedded pertains to radioactive waste, primarily fission product nitrates (Fission Products, F.P.) and nitrates of the transuranium elements, such as neptunium nitrate or americium nitrate. The hydrosol is conveyed into a gelatinization chamber 10 subsequent to the introduction of these materials, and there trickled or added in the form of droplets into an aqueous ammonium bath. The hydrosol droplets react with the ammonia in the ammonia bath (ammonia infeed 10a) and gelatinize into gel particles under an external gelatinizing reaction, whereby particles can be finally withdrawn through a discharge line 11 from the gelatinization chamber 10.

The produced gel particles slide within the discharge line 11 into a washing installation 12, which is supplied with wash water through an inlet line 13. The wash water flows out of the washing installation through a discharge line 14. The wash water contains, on the one hand, ammonium nitrate which was formed in the ammonia bath during the gelatinizing of the hydrosol droplets, as well as materials which were dissolved in the wash water during the washing of the gel particles. During the containment or embedment of radioactive waste in the gel particles, radioactive cesium will in particular dissolve in the wash water. Consequently, the wash water must be cleansed or purified. The cesium can be isolated through an ion exchange.

The washed gel particles are transported from the washing installation 12 through a transport line 15 to a dryer 16, and there freed from the still adherent wash water. The water vapor or steam which is produced during the drying of the gel particles discharges from the dryer through a steam line 17. The cesium which is carried along by the steam must be removed.

The dried gel particles enter into a sintering chamber 18, whose inlet 19 is connected with the dryer 16. The sintering of the gel particles is carried out in a reducing atmosphere. For this purpose, the sintering chamber 18, in this exemplary embodiment, has argon introduced therein through a reduction gas line 20, in which the argon contains 4% hydrogen.

As the end products, encountered in the sintering chamber 18 are extremely strong or resistant ceramic particles, which embed or encapsulate the radioactive waste materials in the $Al_2O_3$ matrix. The fixed materials are strongly embedded, so that the biosphere is protected from any egress of the noxious materials.

Pursuant to the inventive process, the following waste materials are embedded:

EXAMPLE 1

For the formation of the hydrosol, 14 mol of $Al(NO_3)_3.5H_2O$ were dissolved in 10 liters of $H_2O$. The solution was heated to 80° C. and gassed with $NH_3$. Introduced into the solution were 85% by weight of the ammonia gas quantity, which was necessary for a complete precipitation reaction of the aluminum nitrate. After cooling down, the formed hydrosol was conducted into a dialysis cell and freed from formed ammonium nitrate. As a residue, the hydrosol still evidenced a quantity of ammonium nitrate of 0.35 mol/l.

The hydrosol was admixed with fission product nitrates; added to the hydrosol were fission product nitrates in such a quantity that in the sintered matrix there were contained fission products of 20% by weight of the sintered product, which was trickled at a temperature of 40° C. into an ammonia-alkaline precipitation bath, which contained 1% by weight of ammonia. The produced spheroids were washed free with water and dried at 300° C. The sintering temperature consisted of 1500° C.

The wash water discharging from the washing installation contained 0.3 mol ammonium nitrate and 0.03 g cesium for each liter, which could then be removed after the cleansing of the wash water down to a level of 0.003 g/l.

EXAMPLE 2

18 mol $Al(NO_3)_3.5H_2O$ were dissolved in 10 liters of water, heated to 80° C. and, as in Example 1, processed into a hydrosol of 1 liter. The finished hydrosol flowed through the dialysis apparatus and was, in the same manner as in Example 1, freed from ammonium nitrate down to a residual value of 0.2 mol/l. Into this hydrosol there was introduced such a quantity of fission product nitrates, that in the sintered matrix there were contained fission products of 10% by weight of the sintered product. The hydrosol was trickled or added in droplets at a temperature of 30° C. in a manner as has been already described in Example 1. The formed gel spheroids were washed, dried and finally sintered. In the formed ceramic $Al_2O_3$ particles there were resistantly or strongly embedded the waste materials in the same manner as already described in Example 1. Any subjecting of the biosphere to an egress or escape of waste materials could not be detected.

As in the Example 1, the wash water flowing out of the washing installation also contained for each liter approximately 5% of the original amount of ammonium nitrate; in essence, 0.2 mol ammonium nitrate, and 0.02 g cesium. The cleansed wash water evidenced only about $2 \cdot 10^{-3}$ g of cesium.

What is claimed is:

1. A process for containing or imbedding radio-active waste materials in a ceramic matrix, through chemical precipitation of a hydrosol, comprising the steps of;
    preparing a hydrosol through the reaction of a nitrate with ammonia or ammonium hydroxide in a hydrosol preparation unit;
    passing said hydrosol through a dialysis unit to separate any ammonium nitrate formed during said hydrosol preparation step from said hydrosol;
    introducing said waste materials into said hydrosol;

trickling said hydrosol in a pouring column into a precipitation bath for gelatinizing hydrosol particles into gel particles;

subsequently removing said gel particles from said bath for washing and then drying; and sintering said dried gel particles in a reducing atmosphere to form said ceramic matrix;

wherein said waste material is introduced into said hydrosol such that said hydrosol is substantially devoid of ammonium nitrate.

2. A process as claimed in claim 1, wherein the hydrosol is freed from ammonium nitrate immediately prior to the introduction of the material which is to be contained therein.

* * * * *